(12) United States Patent
Albouyeh et al.

(10) Patent No.: US 10,652,290 B2
(45) Date of Patent: May 12, 2020

(54) PERSISTENT CHAT CHANNEL CONSOLIDATION

(71) Applicant: International Business Machines Corporation, Armonk, NY (US)

(72) Inventors: Shadi E. Albouyeh, Raleigh, NC (US); Jonathan Dunne, Dungarvan (IE); Jeremy A. Greenberger, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 225 days.

(21) Appl. No.: 15/696,264

(22) Filed: Sep. 6, 2017

(65) Prior Publication Data
US 2019/0075141 A1     Mar. 7, 2019

(51) Int. Cl.
| | |
|---|---|
| G06F 15/16 | (2006.01) |
| H04L 29/06 | (2006.01) |
| H04L 12/26 | (2006.01) |
| H04L 12/18 | (2006.01) |
| H04L 12/58 | (2006.01) |

(52) U.S. Cl.
CPC ........ H04L 65/403 (2013.01); H04L 12/1827 (2013.01); H04L 43/08 (2013.01); H04L 43/16 (2013.01); *H04L 12/1822* (2013.01); *H04L 43/0876* (2013.01); *H04L 51/04* (2013.01)

(58) Field of Classification Search
CPC ....... H04L 1/0002; H04L 1/0009; H04L 1/16; H04L 65/403; H04L 12/1822; H04L 12/1827; H04L 43/08; H04L 43/16

USPC ................. 709/204–206, 223, 227
See application file for complete search history.

(56) References Cited

U.S. PATENT DOCUMENTS

| | | | |
|---|---|---|---|
| 7,480,510 B1* | 1/2009 | Woleben | H04L 1/1887 370/230 |
| 7,844,662 B2 | 11/2010 | Malik | |
| 8,516,049 B2 | 8/2013 | Dholakia et al. | |
| 8,676,937 B2 | 3/2014 | Rapaport et al. | |
| 8,880,559 B2 | 11/2014 | Bartell | |
| 2009/0228944 A1 | 9/2009 | Bodlaender | |
| 2010/0248771 A1* | 9/2010 | Brewer | H04W 72/10 455/518 |
| 2015/0163824 A1* | 6/2015 | Krzymien | H04W 28/18 370/338 |
| 2015/0248563 A1 | 9/2015 | Alfarano et al. | |
| 2016/0217553 A1* | 7/2016 | Sonoda | G06T 3/4053 |
| 2016/0381526 A1 | 12/2016 | Allen et al. | |

* cited by examiner

*Primary Examiner* — Farzana B Huq
(74) *Attorney, Agent, or Firm* — Schmeiser, Olsen & Watts, LLP; Maeve Carpenter (57) ABSTRACT

An channel consolidation system and method may include analyzing a channel of a persistent chat platform to determine a plurality of metrics associated with the channel, calculating a message channel vitality score for each channel based on the plurality of metrics of the channel, wherein the message channel vitality score of the channel defines an effectiveness of the channel, comparing the message channel vitality score with a predefined effectiveness threshold, determining an action to be taken for the channel based on the comparing of the message channel vitality score and the predefined effectiveness threshold, and performing, by the processor, the action in response to the determining.

17 Claims, 7 Drawing Sheets

FIG. 1

|  | Posts Per Hour | Words Per Hour | Users Per Hour | Sentiment Score | EmotionAnger Relevance |
|---|---|---|---|---|---|
| Channel 111a | 23 | 676 | 4 | 0.781551 | 0.092704 |
| Channel 111b | 657 | 3323326 | 34 | 0.526962 | 0.547249 |
| Channel 111c | 213 | 3312321 | 132 | 0 | negative |
| Channel 111d | 2123 | 321321 | 2323 | 0 | 0.184661 |

|  | Emotion Fear Relevance | Concept Text | Concept Relevance | Keyword Text | Keyword Relevance |
|---|---|---|---|---|---|
| Channel 111a | 0.158114 | colorfulness | 0.915757 | red | 0.915489 |
| Channel 111b | 0.225975 | sports | 0.91136 | athlete | 0.874596 |
| Channel 111c | 0.14282 | athletics | 0.785874 | football | 0.944533 |
| Channel 111d | 0.12785 | pets | 0.433356 | collar | 0.659878 |

PERSISTENT CHAT CHANNEL CONSOLIDATION

TECHNICAL FIELD

The present invention relates to systems and methods for persistent chat channel consolidation, and more specifically to embodiments of a consolidation system for consolidating a persistent chat channel based on a vitality of the chat channel.

BACKGROUND

With an increased usage of persistent chat channel platforms for communication and collaboration, a large number of new chat channels, often for the same purpose, are growing exponentially.

SUMMARY

An embodiment of the present invention relates to a method, and associated computer system and computer program product, for consolidating channels of a persistent chat platform. A processor of a computing system analyzes a channel of a persistent chat platform to determine a plurality of metrics associated with the channel. A message channel vitality score is calculated for each channel based on the plurality of metrics of the channel, wherein the message channel vitality score of the channel defines an effectiveness of the channel. The message channel vitality score is compared with a predefined effectiveness threshold. An action to be taken for the channel is determined based on the comparing of the message channel vitality score and the predefined effectiveness threshold. The action is performed in response to the determining.

DETAILED DESCRIPTION

New persistent chat channels are being created with the increases use of persistent chat channel platforms. Many of the newly created channels have the same purpose of an existing chat channel due to poor regulation of channel creation and a lack of intelligent organization of channels. A problem then arises for individuals who have a need to be a part of or are interested in a certain topic, but may not be aware of a relevant channel.

Thus, there is a need for an automatic channel consolidation system to take an action on the channels by reviewing and processing the discussion within the channel to categorize channels that contain similar types of information or that are geared toward a common purpose.

Figure 1:
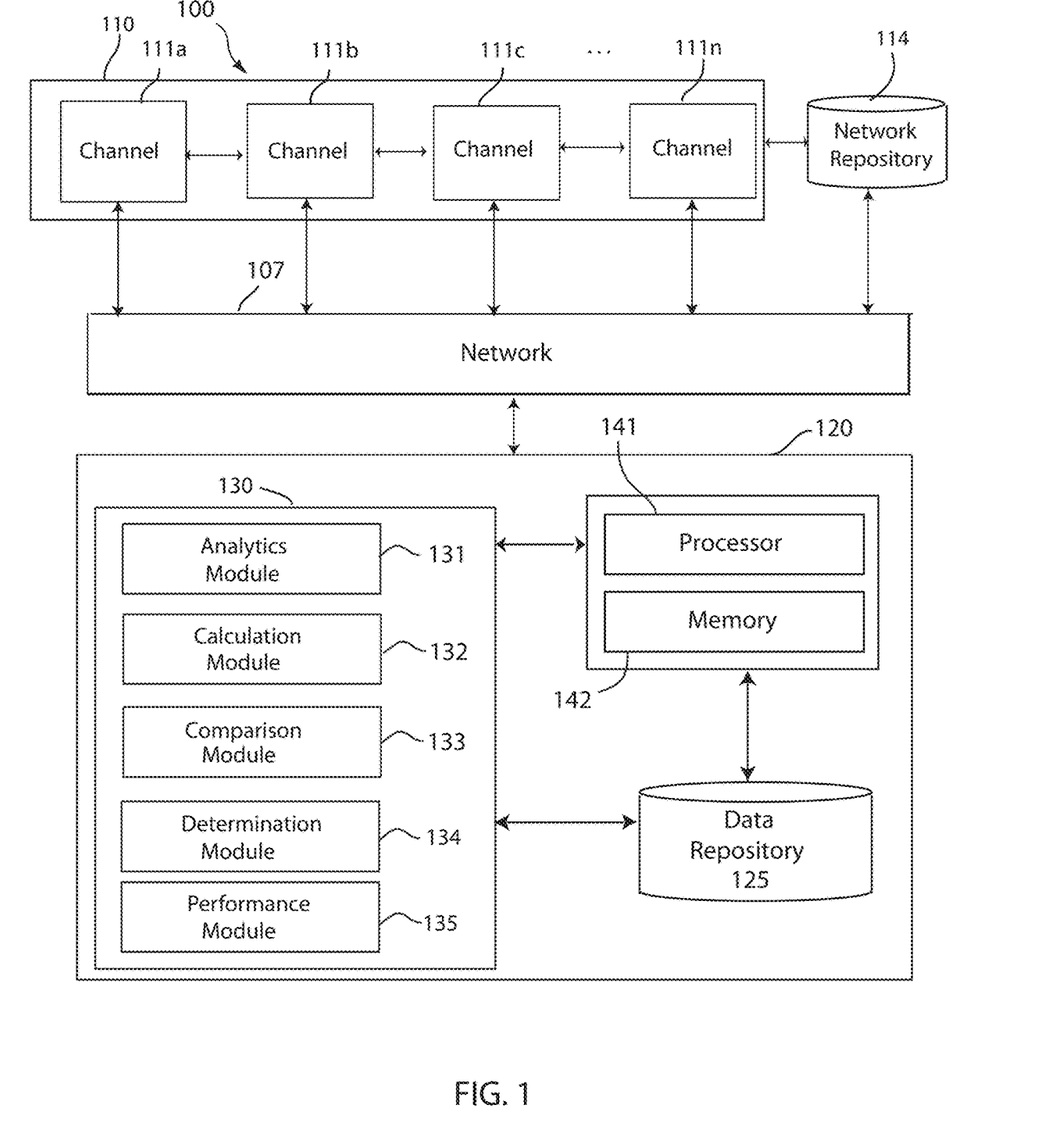
FIG. 1 depicts a block diagram of a consolidation system, in accordance with embodiments of the present invention.

Referring to the drawings, FIG. 1 depicts a block diagram of consolidation system 100, in accordance with embodiments of the present invention. Embodiments of the consolidation system 100 may be a system for intelligently consolidating persistent chat channels based on a vitality of the chat channel. Embodiments of the consolidation system 100 may be useful for persistent chat channel platforms and users of the persistent chat channel platforms for cognitively categorizing channels based on a content/topic of the channel for merging, deleting, bumping, etc. the channel based on a calculated message channel vitality.

Embodiments of the consolidation system 100 may be an intelligent consolidation system, a cognitive consolidation system, a persistent channel modification system, a persistent channel processing system, a channel determination system, an automatic channel merging system, a channel vitality determination system, a channel analyzing system, and the like. Embodiments of the consolidation system 100 may include a computing system 120. Embodiments of the computing system 120 may be a computer system, a computer, a computing device, a server, one or more servers, and the like.

Furthermore, embodiments of consolidation system 100 may include a persistent chat platform 110. Embodiments of the persistent chat channel platform 110 may be a persistent chat platform, a pervasive chat room platform, a real-time messaging platform, an online community, a cloud-based collaboration platform, a cloud-based collaboration service, a community chat platform, a searchable chat platform, a cloud-based chat channel platform, a team messaging platform, or any cloud-based, web-based platform allowing formation of a chat room or chat channel that supports messaging, file sharing, user collaboration, user social networking, and the like. Embodiments of the persistent chat channel platform 110 may include one or more chat channels 111$a$, 111$b$, 111$c$ . . . 110$n$. Embodiments of the channels 111$a$, 111$b$, 111$c$ . . . 111$n$ may be a channel, a chat channel, a chat room, a messaging platform, a message board, an invitation only chat channel, a public chat channel, and the like, which may be individually searchable, archived, logged, organized, moderated, etc. Embodiments of the channels 111$a$, 111$b$, 111$c$ . . . 111$n$ may be associated with a particular topic for discussion, a task, a work team, a group of users, public users, and the like. Each channel 111$a$, 111$b$, 111$c$ . . . 111$n$ may initially be formed with a stated objective or topic, and depending on the content posted in the channel, the initial objective may be changed or diverged from as the chat channel is being used by users.

Moreover, embodiments of the persistent chat platform 110 and/or the channels 111$a$, 111$b$, 111$c$ . . . 111$n$ may be communicatively coupled to a computing system 120 of the alert system 100 over a network 107. For instance, information/data may be transmitted to and/or received from the persistent chat platform 110 and/or one or more channels 111$a$, 111$b$, 111$c$ . . . 111$n$ over a network 107. A network 107 may be the cloud. Further embodiments of network 107 may refer to a group of two or more computer systems linked together. Network 107 may be any type of computer network known by individuals skilled in the art. Examples of computer networks 107 may include a LAN, WAN, campus area networks (CAN), home area networks (HAN), metropolitan area networks (MAN), an enterprise network, cloud computing network (either physical or virtual) e.g. the Internet, a cellular communication network such as GSM or CDMA network or a mobile communications data network. The architecture of the computer network 107 may be a peer-to-peer network in some embodiments, wherein in other embodiments, the network 107 may be organized as a client/server architecture.

In some embodiments, the network 107 may further comprise, in addition to the computing system 120, a connection to one or more network-accessible knowledge bases 114 containing channel information, channel owner information, user activity, channel pre-set preferences, network repositories or other systems connected to the network 107 that may be considered nodes of the network 107. In some embodiments, where the computing system 120 or network repositories allocate resources to be used by the other nodes of the network 107, the computing system 120 and network repository 114 may be referred to as servers.

The network repository 114 may be a data collection area on the network 107 which may back up and save all the data transmitted back and forth between the nodes of the network 107. For example, the network repository may be a data center saving and cataloging user activity data, user data, channel data, channel preferences data, and the like, to generate both historical and predictive reports regarding a particular user or channel, and the like. In some embodiments, a data collection center housing the network repository 114 may include an analytic module capable of analyzing each piece of data being stored by the network repository 114. Further, the computing system 120 may be integrated with or as a part of the data collection center housing the network repository 114. In some alternative embodiments, the network repository 114 may be a local repository that is connected to the computing system 120.

Furthermore, embodiments of the computing system 120 may be equipped with a memory device 142 which may store various data/information/code, and a processor 141 for implementing the tasks associated with the consolidation system 100. In some embodiments, a channel consolidation application 130 may be loaded in the memory 142 of the computing system 120. The computing system 120 may further include an operating system, which can be a computer program for controlling an operation of the computing system 120, wherein applications loaded onto the computing system 120 may run on top of the operating system to provide various functions. Furthermore, embodiments of computing system 120 may include the channel consolidation application 130. Embodiments of the channel consolidation application 130 may be an interface, an application, a program, a module, or a combination of modules. In an exemplary embodiment, the channel consolidation application 130 may be a software application running on one or more back end servers, servicing a persistent chat platform engine/platform.

The channel consolidation application 130 of the computing system 120 may include an analytics module 131, a calculation module 132, a comparison module 133, a determination module 134, and a performance module 135. A "module" may refer to a hardware-based module, software-based module or a module may be a combination of hardware and software. Embodiments of hardware-based modules may include self-contained components such as chipsets, specialized circuitry and one or more memory devices, while a software-based module may be part of a program code or linked to the program code containing specific programmed instructions, which may be loaded in the memory device of the computing system 120. A module (whether hardware, software, or a combination thereof) may be designed to implement or execute one or more particular functions or routines.

Embodiments of the analytics module 131 may include one or more components of hardware and/or software program code for analyzing a channel 111a, 111b, 111c . . . 111n of a persistent chat platform 100 to determine a plurality of metrics associated with the channel 111a, 111b, 111c . . . 111n. For instance, embodiments of the analytics module 131 may analyze the content of the channel 111a, 111b, 111c . . . 111n to determine a plurality of metrics associated with the channel 111a, 111b, 111c . . . 111n. Embodiments of the plurality of metrics mays include a text of the channel, an activity of one or more members of the channel, and an initial objective of the channel, a topic of the channel, a current topic of the channel, a mood of the channel, an expertise level of the channel, an activity of the channel, a current content of the channel, a number of files shared, a recency of activity/sharing/comments etc. of the channel, and the like. In an exemplary embodiment, the content of the channel 111a, 111b, 111c . . . 111n may be analyzed by a text analysis system that may parse, identify, etc. words using, for example, a natural language processing technique, to analyze the content of the channel chat messages and the user activity of the channel. Accordingly, embodiments of the analytics module 131 may analyze the channel to determine a plurality of metrics associated with the channel, for calculating a vitality of the channel.

Figure 2:
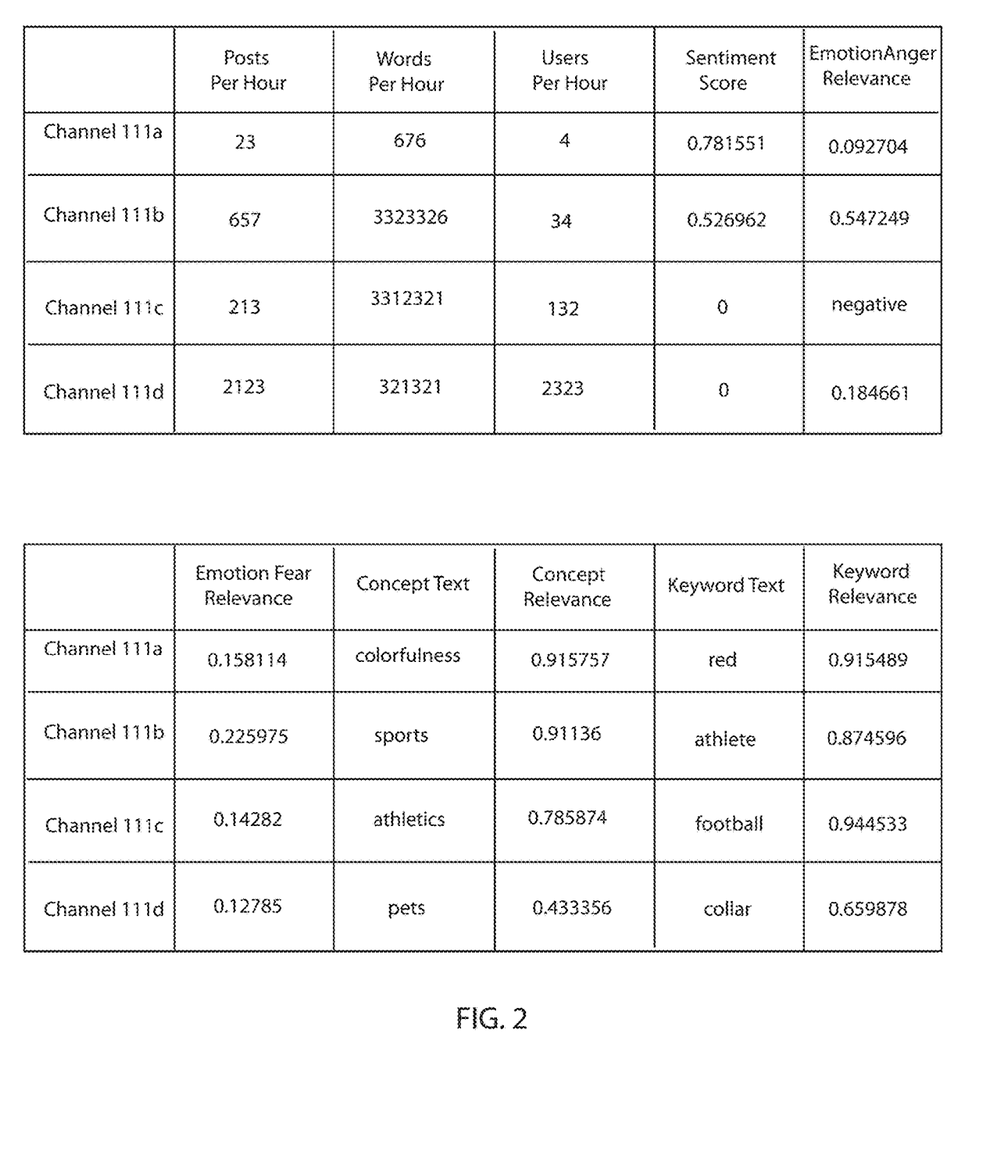
FIG. 2 depicts a data table associated with a plurality of metrics of a channel of the persistent chat channel platform, in accordance with embodiments of the present invention.

Embodiments of the computing system 120 may also include a calculation module 132. Embodiments of the calculation module 132 may include one or more components of hardware and/or software program code for calculating a message channel vitality (MCV) score for each channel 111a, 111b, 111c . . . 111n based on the plurality of metrics of the channel 111a, 111b, 111c . . . 111n. Embodiments of the MCV score may define a vitality of the channel, or an effectiveness of the channel. The calculation module 132 may calculate the MCV score using values (e.g. represented by a number) associated with the plurality of metrics of the channel 111a, 111b, 111c . . . 111n. In an exemplary embodiment, the calculation module 132 may process the values associated with the plurality of metrics into a data table for machine learning techniques to determine the MCV score. FIG. 2 depicts a data table associated with a plurality of metrics of a channel 111a, 111b, 111c . . . 111n of the persistent chat channel platform 110, in accordance with embodiments of the present invention. For instance, embodiments of the data table in FIG. 2 include numbers associated with various metrics of the channel. The data associated with the plurality of metrics of the channel 111a, 111b, 111c . . . 111n may include posts per hour, words per hour, users per hour, sentiment score, sentiment type, an emotional relevance (e.g. fear, anger, disgust, sadness, joy, etc.) concept text, concept relevance, keyword(s) text, keyword(s) relevance, and the like. Using machine learning techniques, the calculation module 132 may determine a MCV score, based on the data processed from the data table. In an exemplary embodiment, the calculation module 132 may perform a linear regression technique to determine a MCV score of a channel of the persistent chat platform 110. The calculation module 132 may use other techniques and/or statistical models, such as a principal component analysis, to determine the MCV score based on the data associated with the plurality of metrics derived from the channel(s).

Referring back to FIG. 1, embodiments of the computing system 120 may include a comparison module 133. Embodiments of the comparison module 133 may include one or more components of hardware and/or software program code for comparing the message channel vitality score with a predefined effectiveness threshold. For instance, embodiments of the comparison module 133 may compare the calculated MCV score for each channel 111a, 111b, 111c . . . 111n with a predetermined MCV/effectiveness threshold to determine whether or not the MCV score exceeds the effectiveness threshold. Embodiments of the predefined effectiveness threshold may include a plurality of ranges, such as a first range of effectiveness, a second range of effectiveness, and a third range of effectiveness, wherein each range of effectiveness may define a range of MCV scores associated with a particular action to take for each analyzed channel. In an exemplary embodiment, the first range of effectiveness may be less than 0 or less than 0% effective, the second range of effectiveness may be between 0 or 0% and 50 or 50%, and the third range of effectiveness may be greater than 50 or 50%. The effectiveness threshold may vary depending on the application or may be dynamic based on one or more parameters of the channel. For example, channels known to be for organized team-based projects may have a different effectiveness threshold than a channel known to be for discussing a particular topic (e.g. movies, plumbing, new tech gadgets, etc.). The MCV/effectiveness threshold may be individualized to each channel based on the owner/moderator of the channel, such that the action to be taken for each individual channel may vary depending on user-set preferences, user tolerance, and the like. For instance, each owner or creator of the channel may establish a unique effectiveness threshold for the channel, such that the determined action may be affected. Similarly, the persistent chat platform 1110 may establish unique effectiveness thresholds for each channel at the creation of the channel and/or depending on the purpose, topic, activity, etc. of the channel.

Embodiments of the computing system 120 may further include a determination module 134. Embodiments of the determination module 134 may include one or more components of hardware and/or software program code for determining an action to be taken for the channel 111a, 111b, 111c . . . 111n based on the comparing of the message channel vitality score and the predefined effectiveness threshold. For instance, embodiments of the determination module 134, in response to the comparing performed by the comparison module 133, may determine an action for the channel 111a, 111b, 111c . . . 111n, such as whether to merge the channel with another channel, whether to delete the channel, or whether to bump the channel. In an exemplary embodiment, if the message channel vitality score is within the first range of effectiveness, the action to be taken may be a deleting of the channel. The first range of effectiveness may be a lower MCV score due to an ineffectiveness of the channel or a weak vitality of the channel. Referring again to FIG. 2, channel 111a may have a lower MCV score that may not exceed a 0% effectiveness threshold, and thus the determination module 134 may determine that channel 111a should be deleted. If the MCV score is within the second range of effectiveness, the action to be taken may be to merge the channel with another channel of the persistent chat platform 110. For example, if the channel is greater than 0% effective but less than 50% effective, the determination module 134 may determine that the channel should be merged with another channel, for example, with a channel that may be equally effective and share a same topic, purpose, level of expertise, activity level of the users, etc. Referring again to FIG. 2, channel 111b may have a MCV score between 0-50, and thus the determination module 134 may determine that channel 111b should be merged with another channel. The determination module 134 may search the persistent chat channel platform 110 for a channel that may be similar to channel 111b, in terms of effectiveness and topic. As a result of searching, the determination module 111c may locate channel 111c, which may have a similar MCV score and a similar topic (e.g. athletics and sports). The determination module 134 may therefore determine that channel 111b should be merged with channel 111c. Further, if the MCV score is within the third range of effectiveness, the action to be taken may be to bump the channel, which may be referred to as "chumping." Bumping a channel may include boosting or promoting the channel so that the channel reaches more users or becomes more available to users, given the channel's higher effectiveness (i.e. MCV score). For example, if the channel is greater than 50% effective, the determination module 134 may determine that the channel should be "chumped." Referring again to FIG. 2, channel 111d may have a high MCV score greater than 50 (e.g. greater than 50% effective), and thus the determination module 134 may determine that channel 111d should be "chumped."

Embodiments of the computing system 120 may further include a performance module 135. Embodiments of the performance module 135 may include one or more components of hardware and/or software program code for performing the action in response to the determining which action to take for a given channel 111a, 111b, 111c . . . 111n. For instance, embodiments of the performance module 135 may delete a channel if the determination module 134 has determined that the channel should be deleted. Similarly, the performance module 135 may be responsible for merging channels on the persistent chat platform 110, as well as "chumping" a channel. The performance module 135 may, for example, instruct a server associated with the persistent chat platform 110 to take the action, or the computer system 120 may perform the action.

Moreover, embodiments of the performance module 135 may evaluate user and/or channel preferences prior to performing the action. For example, the performance module 135 may access a database associated with the channel or the persistent chat platform to determine a method in which the performance module 135 takes an action. In the case of a channel merger, the performance module 135 may send a merge request to an owner of the channel and/or owner of the other channel to complete the merge. Alternatively, the performance module 135, may automatically create a poll for the one or more members to decide whether to merge the channel. Polling can also be used to allow suggestion of merging incoming webhooks. Webhooks that may be fed into individual channels can be analyzed to monitor a type of content of the channel, which may also monitor interactions with the webhooks. For example, if many users in the channel provide a "thumbs up" or a sad emoji face, those can be analyzed and/or monitored to suggest content that can be integrated into a new channel. Further, the performance module 135 may automatically perform the merging of the channels, in response to the determining of the determination module 134. Accordingly, the manner in which the performance module 135 performs the action may be dependent on the user or channel setting, accessed prior to taking the action, or the performance by the performance module 135 may be fully automated, without seeking permission from one or more users, and only providing a notification to the one or more user. Furthermore, the performance module 135 may, for example after a merging of the channel with another channel of the persistent chat platform, include an indicator associated with a comment, post, file shared, etc. indicating which channel the comment, post, file shared, etc. originated from to allow the users to track an origin or past of the content.

Various tasks and specific functions of the modules of the computing system 120 may be performed by additional modules, or may be combined into other module(s) to reduce the number of modules. For example, the comparison module 133 may be combined with the determination module 134 for comparing the MCV score with the MCV threshold to determine an action to be taken for a particular channel. Further, embodiments of the computer or computer system 120 may comprise specialized, non-generic hardware and circuitry (i.e., specialized discrete non-generic analog, digital, and logic-based circuitry) (independently or in combination) particularized for executing only methods of the present invention. The specialized discrete non-generic analog, digital, and logic-based circuitry may include proprietary specially designed components (e.g., a specialized integrated circuit, such as for example an Application Specific Integrated Circuit (ASIC), designed for only implementing methods of the present invention). Moreover, embodiments of the consolidation system 100 may improve persistent chat platforms by offering a method to intelligently consolidate channels based on a content of the channels, and various metrics associated with the channel. Thus, the consolidation system 100 may be individualized to each channel on the persistent chat platform, which is being used to consolidate channels based on a metric of the channel in view of a unique effectiveness threshold, by analyzing the content of the channel and using computer resources. The cognitive consolidation improves the persistent chat platform by making useful information distributed over one or more channels available in a single location (e.g. merging), boost availability of information and content to users that has been rated to be effective ("chumping"), and spares computer resources and processing power resources by effectively deleting a channel based on an determined ineffectiveness of the channel.

Figure 3:
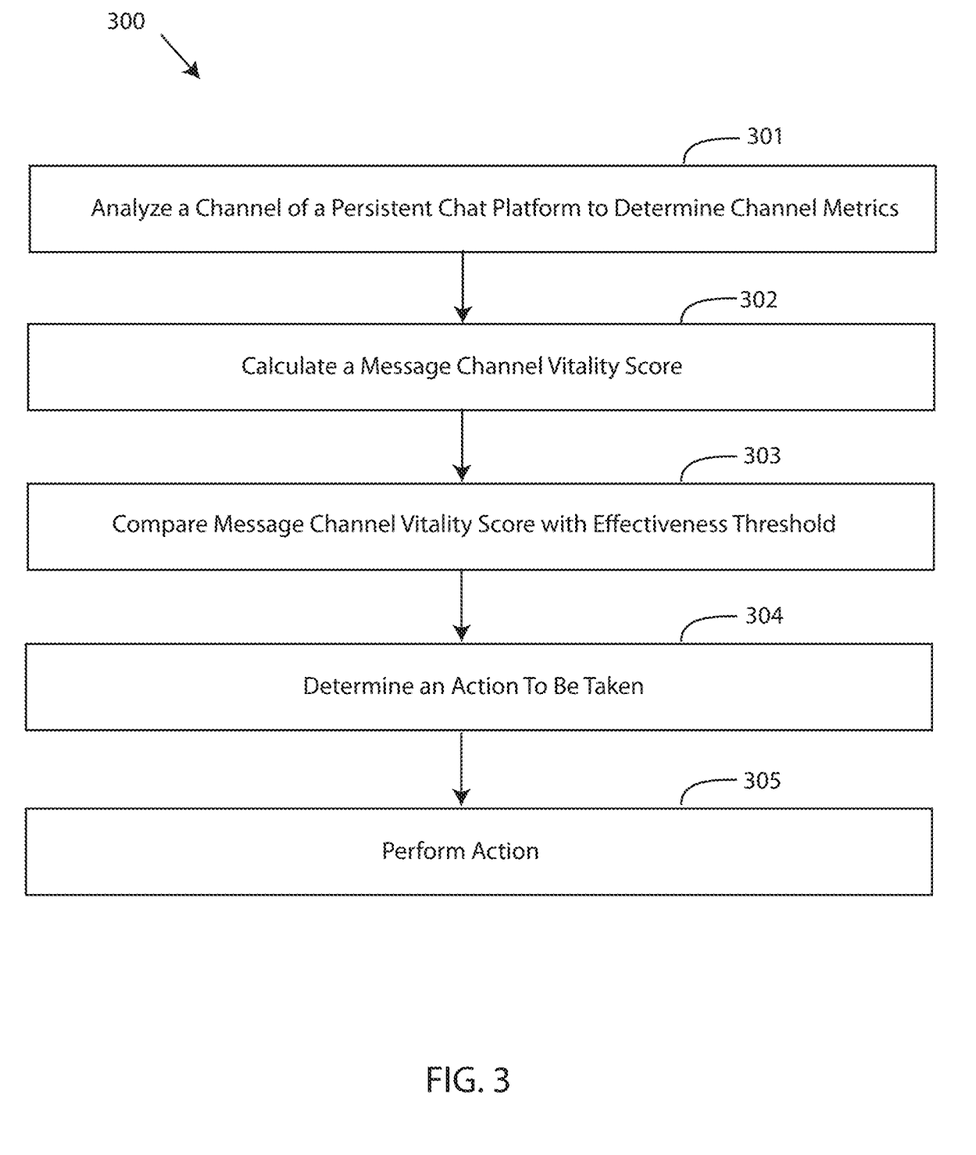
FIG. 3 depicts a flow chart of a method for persistent chat channel consolidation, in accordance with embodiments of the present invention.

Referring now to FIG. 3, which depicts a flow chart of a method 300 for persistent chat channel consolidation, in accordance with embodiments of the present invention. One embodiment of a method 300 or algorithm that may be implemented for persistent chat channel consolidation with the consolidation system 100 described in FIGS. 1-2 using one or more computer systems as defined generically in FIG. 5 below, and more specifically by the specific embodiments of FIG. 1.

Embodiments of the method 300 for persistent chat channel consolidation, in accordance with embodiments of the present invention, may begin at step 301 wherein a channel 111*a*, 111*b*, 111*c* . . . 111*n* of a persistent chat platform 110 may be analyzed to determine channel metrics, such as a text of the channel, a user activity of the channel, an initial and current objective of the channel, and the like. Step 302 calculates a message vitality score of the channel, based on the metrics of the channel analyzed in step 301. Step 303 compares the MCV score with a MCV/effectiveness threshold. Step 304 determines an action to be taken for the analyzed channel, based on the comparison performed by step 303. Step 305 performs the determined action.

Figure 4:
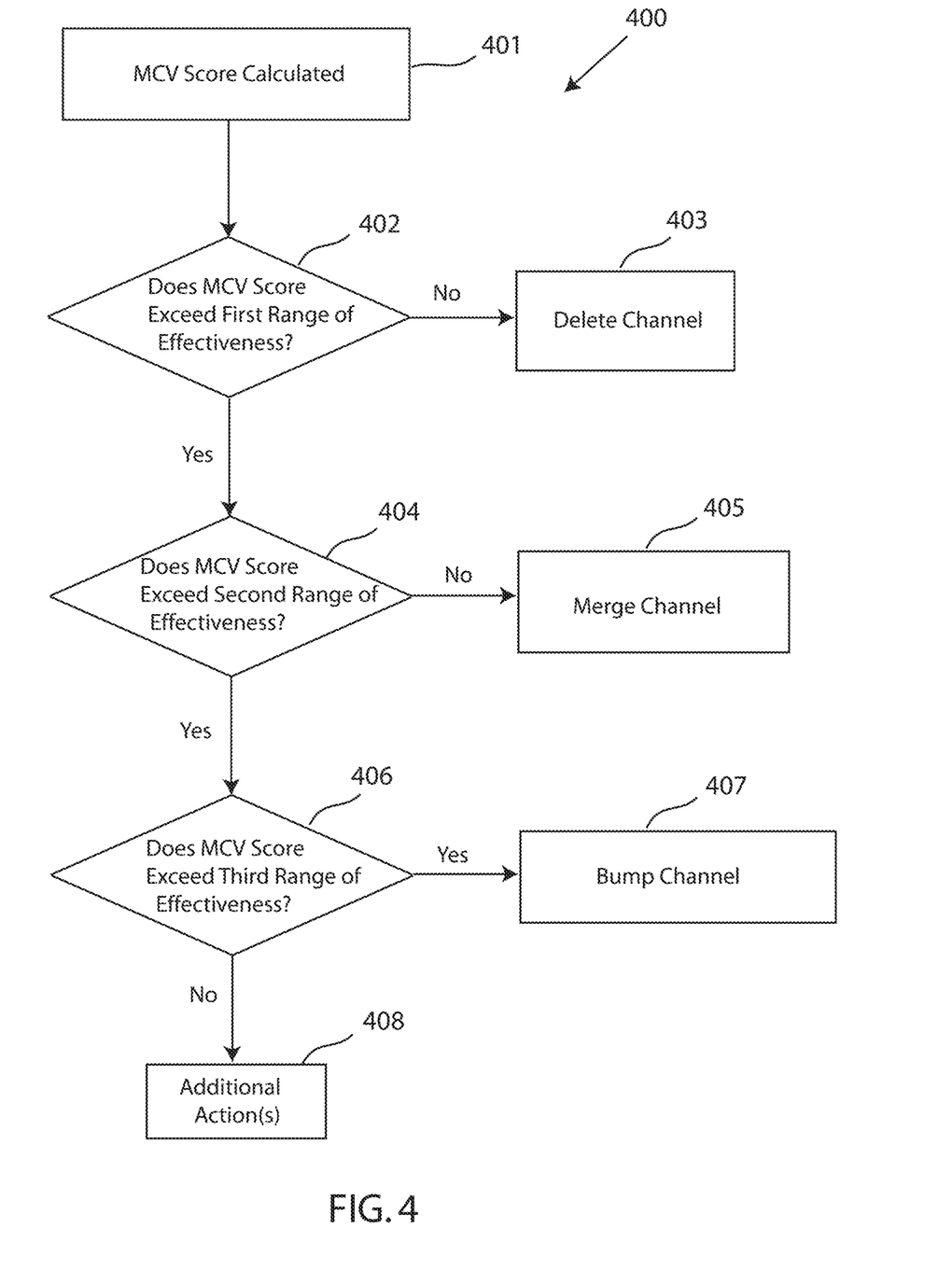
FIG. 4 depicts a detailed flow chart of a method for determining an action to be taken for a channel of a persistent chat platform, in accordance with embodiments of the present invention.

FIG. 4 depicts a detailed flow chart of a method 400 for determining an action to be taken for a channel of a persistent chat platform, in accordance with embodiments of the present invention. Embodiments of the method 400 for determining an action to be taken for a channel of a persistent chat platform may begin at step 401, wherein the MCV score is calculated. Step 402 determines whether the calculated MCV score exceeds a first range of effectiveness (e.g. less than 0%-0% effective). If no, then step 403 deletes the channel accordingly. If yes, step 404 determines whether the MCV score exceeds a second range of effectiveness (e.g. 50% effective). If no, then step 405 merges the channel with another channel, as described above. If yes, then step 406 determines whether the MCV score exceeds a third range of effectiveness (e.g. greater than 50% effective). If yes, then step 407 bumps, boosts, promotes, or "chumps" the channel, as described above. If no, then step 408 confirms that the percentage effectiveness of the channel is between 0%-50%, and merges the channel, or takes additional actions, such as restarting the method.

Figure 5:
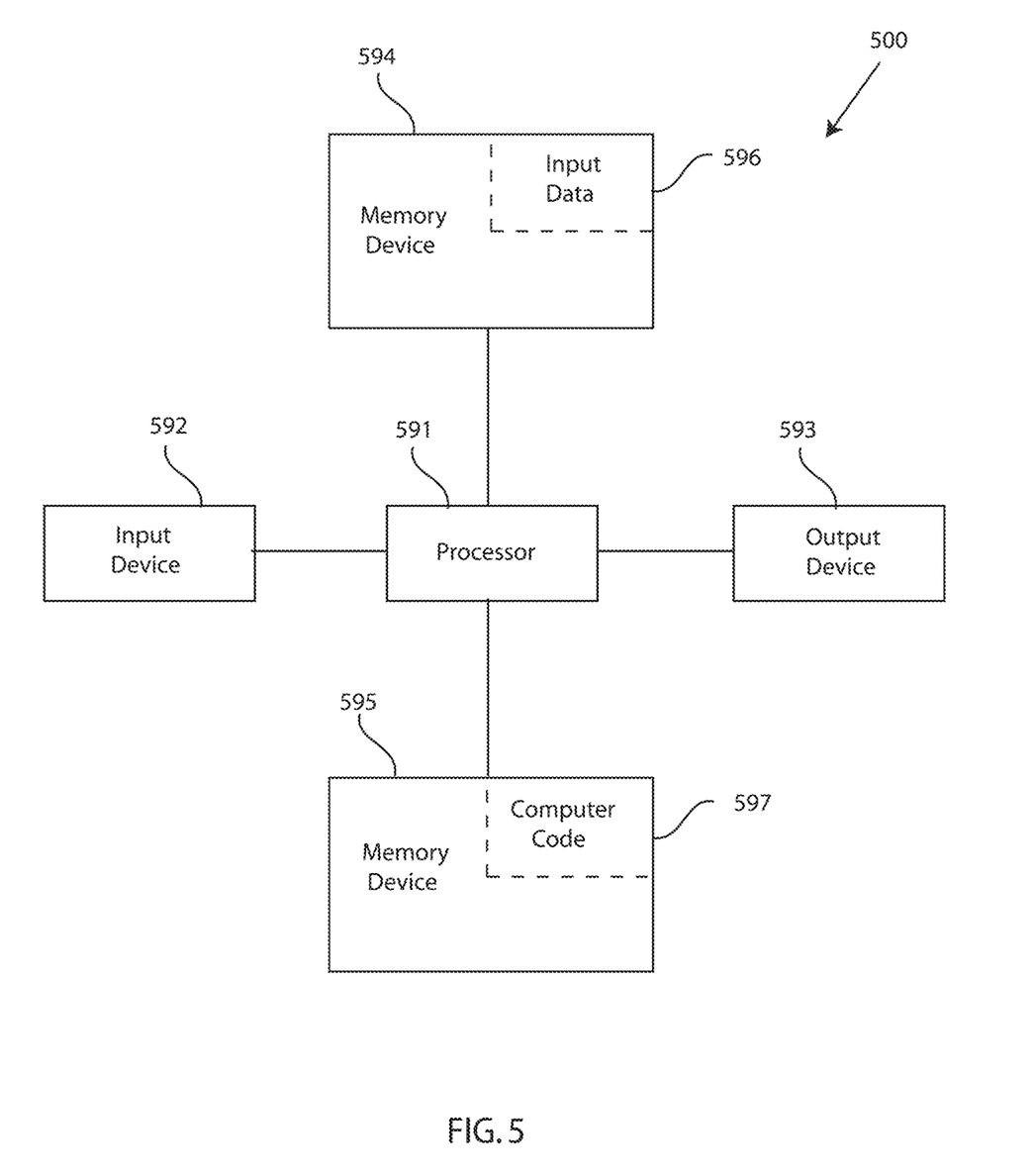
FIG. 5 depicts a block diagram of a computer system for the consolidation system of FIGS. 1-2, capable of implementing methods for persistent chat channel consolidation of FIGS. 3-4, in accordance with embodiments of the present invention.

FIG. 5 depicts a block diagram of a computer system for the consolidation system of FIGS. 1-2, capable of implementing methods for persistent chat channel consolidation of FIGS. 3-4, in accordance with embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer 500, including executing instructions included in the computer code 597 for the tools and programs capable of implementing a method for persistent chat channel consolidation in the manner prescribed by the embodiments of FIGS. 3-4 using the consolidation system 100 of FIGS. 1-2, wherein the instructions of the computer code 597 may be executed by processor 591 via memory device 595. The computer code 597 may include software or program instructions that may implement one or more algorithms for implementing the method for persistent chat channel consolidation, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer-readable program embodied therein and/or having other data stored therein, wherein the computer-readable program comprises the computer code 597. Generally, a computer program product (or, alternatively, an article of manufacture) of the computer system 500 may comprise said computer usable storage medium (or said program storage device).

Memory devices 594, 595 include any known computer-readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 5.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. or in some embodiments the touchscreen of a computing device. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 500, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository 125 as shown in FIG. 1.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to intelligent channel consolidation systems and methods. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer 500) including one or more processor(s) 591, wherein the processor(s) carry out instructions contained in the computer code 597 causing the computer system to consolidate persistent chat channels. Another embodiment discloses a process for supporting computer infrastructure, where the process includes integrating computer-readable program code into a computer system including a processor.

The step of integrating includes storing the program code in a computer-readable storage device of the computer system through use of the processor. The program code, upon being executed by the processor, implements a method for persistent chat channel consolidation. Thus, the present invention discloses a process for supporting, deploying and/or integrating computer infrastructure, integrating, hosting, maintaining, and deploying computer-readable code into the computer system 500, wherein the code in combination with the computer system 500 is capable of performing a method for persistent chat channel consolidation.

A computer program product of the present invention comprises one or more computer-readable hardware storage devices having computer-readable program code stored therein, said program code containing instructions executable by one or more processors of a computer system to implement the methods of the present invention.

A computer system of the present invention comprises one or more processors, one or more memories, and one or more computer-readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
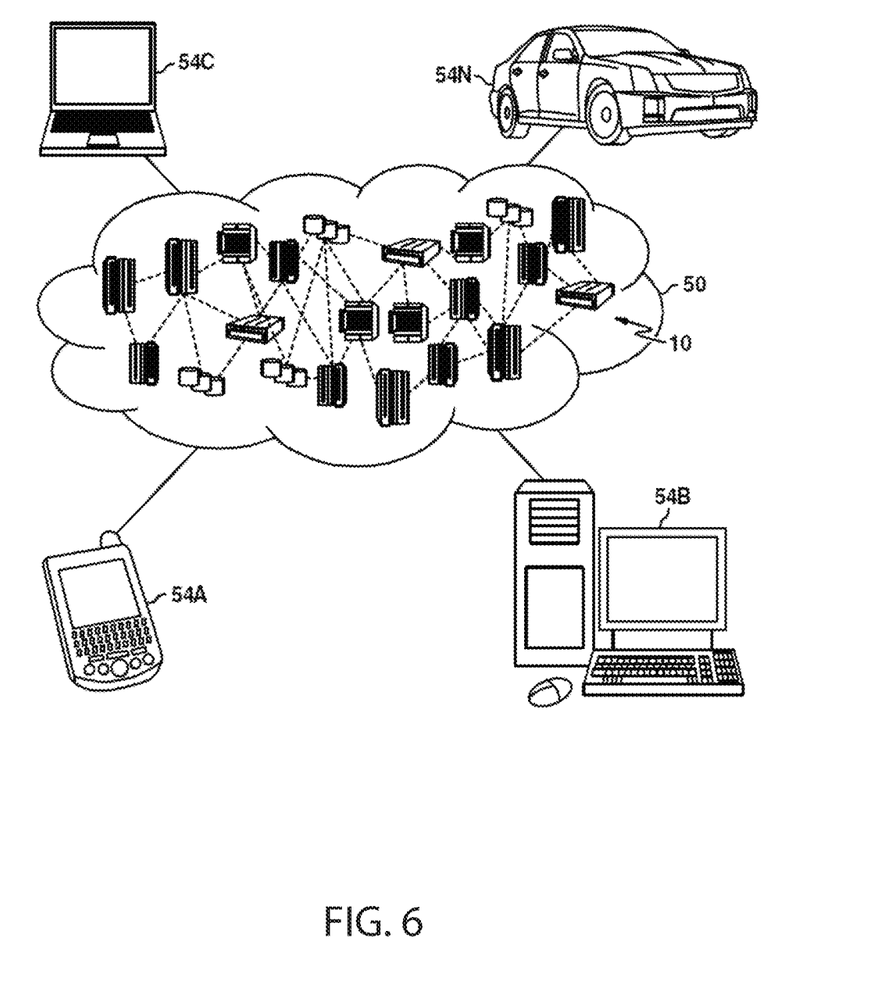
FIG. 6 depicts a cloud computing environment, in accordance with embodiments of the present invention.

Referring now to FIG. 12, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 6 are intended to be illustrative only and that computing nodes 10 and cloud computing environment 50 can communicate with any type of computerized device over any type of network and/or network addressable connection (e.g., using a web browser).

Figure 7:
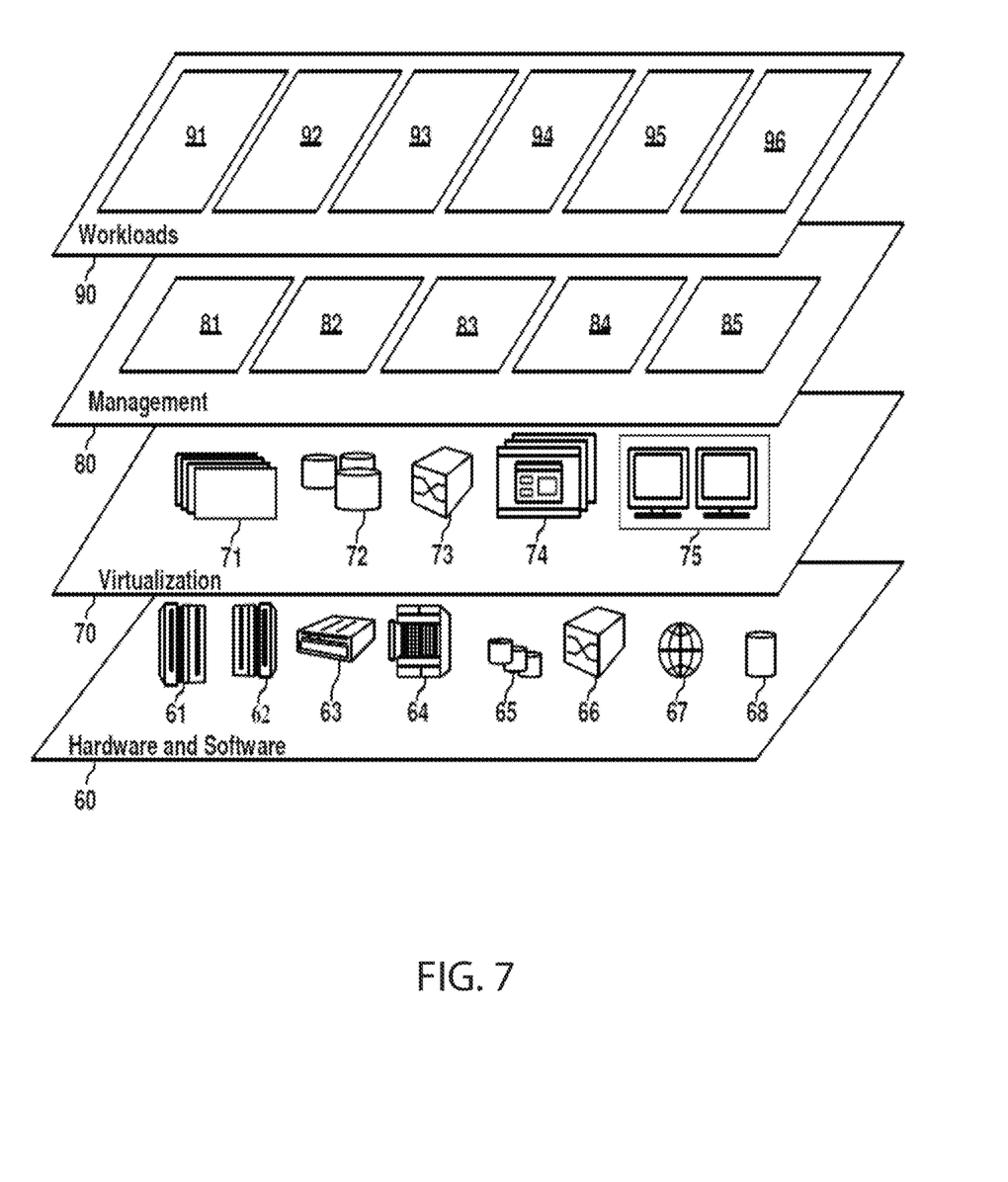
FIG. 7 depicts abstraction model layers, in accordance with embodiments of the present invention.

Referring now to FIG. 7, a set of functional abstraction layers provided by cloud computing environment 50 (see FIG. 6) are shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and channel consolidation 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein

What is claimed is:

1. A method for persistent chat channel consolidation, the method comprising:
    analyzing, by a processor of a computing system, a channel of a persistent chat platform to determine a plurality of metrics associated with the channel;
    calculating, by the processor, a message channel vitality score for each channel based on the plurality of metrics of the channel, wherein the message channel vitality score of the channel defines an effectiveness of the channel;

comparing, by the processor, the message channel vitality score with a predefined effectiveness threshold;
determining, by the processor, an action to be taken for the channel based on the comparing of the message channel vitality score and the predefined effectiveness threshold; and
performing, by the processor, the action in response to the determining;
wherein the predefined effectiveness threshold includes a first range of effectiveness, a second range of effectiveness, and a third range of effectiveness, further when the message channel vitality score is within:
the first range of effectiveness, the action to be taken is a deleting of the channel;
the second range of effectiveness, the action to be taken is a merging of the channel with another channel of the persistent chat platform; and
the third range of effectiveness, the action to be taken is a chumping of the channel.

2. The method of claim 1, wherein the action to be taken for the channel includes deleting the channel, merging the channel with another channel in the persistent chat platform, and chumping the channel.

3. The method of claim 1, wherein the plurality of metrics of the channel include a text of the channel, an activity of one or more members of the channel, and an initial objective of the channel.

4. The method of claim 1, wherein the merging of the channel includes:
sending, by the processor, a merge request to an owner of the channel; or
creating, by the processor, a poll to the one or more members to merge the channel.

5. The method of claim 1, wherein the merging is performed automatically, in response to the determining that the action to be taken is merging.

6. The method of claim 1, wherein after a merging of the channel with another channel of the persistent chat platform, each comment to the merged channel includes an indicator indicating which channel the comment came from.

7. A computer system, comprising:
a processor;
a memory device coupled to the processor; and
a computer readable storage device coupled to the processor, wherein the storage device contains program code executable by the processor via the memory device to implement a method for persistent chat channel consolidation, the method comprising:
analyzing, by a processor of a computing system, a channel of a persistent chat platform to determine a plurality of metrics associated with the channel;
calculating, by the processor, a message channel vitality score for each channel based on the plurality of metrics of the channel, wherein the message channel vitality score of the channel defines an effectiveness of the channel;
comparing, by the processor, the message channel vitality score with a predefined effectiveness threshold;
determining, by the processor, an action to be taken for the channel based on the comparing of the message channel vitality score and the predefined effectiveness threshold; and
performing, by the processor, the action in response to the determining;
wherein the predefined effectiveness threshold includes a first range of effectiveness, a second range of effectiveness, and a third range of effectiveness, further when the message channel vitality score is within:
the first range of effectiveness, the action to be taken is a deleting of the channel;
the second range of effectiveness, the action to be taken is a merging of the channel with another channel of the persistent chat platform; and
the third range of effectiveness, the action to be taken is a chumping of the channel.

8. The computer system of claim 7, wherein the action to be taken for the channel includes deleting the channel, merging the channel with another channel in the persistent chat platform, and chumping the channel.

9. The computer system of claim 7, wherein the plurality of metrics of the channel include a text of the channel, an activity of one or more members of the channel, and an initial objective of the channel.

10. The computer system of claim 7, wherein the merging of the channel includes:
sending, by the processor, a merge request to an owner of the channel; or
creating, by the processor, a poll to the one or more members to merge the channel.

11. The computer system of claim 7, wherein the merging is performed automatically, in response to the determining that the action to be taken is merging.

12. The computer system of claim 7, wherein after a merging of the channel with another channel of the persistent chat platform, each comment to the merged channel includes an indicator indicating which channel the comment came from.

13. A computer program product, comprising a computer readable hardware storage device storing a computer readable program code, the computer readable program code comprising an algorithm that when executed by a computer processor of a computing system implements a method for persistent chat channel consolidation, the method comprising:
analyzing, by a processor of a computing system, a channel of a persistent chat platform to determine a plurality of metrics associated with the channel;
calculating, by the processor, a message channel vitality score for each channel based on the plurality of metrics of the channel, wherein the message channel vitality score of the channel defines an effectiveness of the channel;
comparing, by the processor, the message channel vitality score with a predefined effectiveness threshold;
determining, by the processor, an action to be taken for the channel based on the comparing of the message channel vitality score and the predefined effectiveness threshold; and
performing, by the processor, the action in response to the determining;
wherein the predefined effectiveness threshold includes a first range of effectiveness, a second range of effectiveness, and a third range of effectiveness, further when the message channel vitality score is within:
the first range of effectiveness, the action to be taken is a deleting of the channel;
the second range of effectiveness, the action to be taken is a merging of the channel with another channel of the persistent chat platform; and
the third range of effectiveness, the action to be taken is a chumping of the channel.

14. The computer program product of claim 13, wherein the action to be taken for the channel includes deleting the channel, merging the channel with another channel in the persistent chat platform, and chumping the channel.

15. The computer program product of claim 13, wherein the plurality of metrics of the channel include a text of the channel, an activity of one or more members of the channel, and an initial objective of the channel.

16. The computer program product of claim 13, wherein the merging of the channel includes:
   sending, by the processor, a merge request to an owner of the channel; or
   creating, by the processor, a poll to the one or more members to merge the channel.

17. The computer program product of claim 13, wherein the merging is performed automatically, in response to the determining that the action to be taken is merging.

* * * * *